United States Patent
Hong et al.

(10) Patent No.: US 12,548,117 B2
(45) Date of Patent: Feb. 10, 2026

(54) DEVICE AND METHOD WITH INCREASING RESOLUTION OF FRAME IN G-BUFFER DOMAIN

(71) Applicant: Samsung Electronics Co., Ltd., Suwon-si (KR)

(72) Inventors: Seokpyo Hong, Suwon-si (KR); Nahyup Kang, Suwon-si (KR); Hanjun Kim, Suwon-si (KR); Jaeyoung Moon, Suwon-si (KR); Hyeonseung Yu, Suwon-si (KR); Juyoung Lee, Suwon-si (KR); Hwiryong Jung, Suwon-si (KR); Inwoo Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 301 days.

(21) Appl. No.: 18/351,963

(22) Filed: Jul. 13, 2023

(65) Prior Publication Data

US 2024/0249383 A1 Jul. 25, 2024

(30) Foreign Application Priority Data

Jan. 20, 2023 (KR) .................. 10-2023-0008997

(51) Int. Cl.
G06T 3/4053 (2024.01)
G06T 3/18 (2024.01)
G06T 3/4046 (2024.01)

(52) U.S. Cl.
CPC .............. *G06T 3/4053* (2013.01); *G06T 3/18* (2024.01); *G06T 3/4046* (2013.01)

(58) Field of Classification Search
CPC ....... G06T 3/4053; G06T 3/18; G06T 3/4046; G06T 15/00; G06T 15/405; G06T 3/40; G06T 15/06; G06N 3/045; G06N 3/063
See application file for complete search history.

(56) References Cited

U.S. PATENT DOCUMENTS 9,280,846 B2   3/2016 Lee et al.
9,390,540 B2 * 7/2016 Uralsky ................ G06T 15/005
(Continued)

FOREIGN PATENT DOCUMENTS

KR    10-2020-0051280 A    5/2020

OTHER PUBLICATIONS

Guo et al. "ExtraNet: real-time extrapolated rendering for low-latency temporal supersampling." *ACM Transactions on Graphics (TOG)* vol. 40. Issue 6. 2021 (pp. 1-16).
(Continued)

*Primary Examiner* — Henok Shiferaw
*Assistant Examiner* — Woo C Rhim
(74) *Attorney, Agent, or Firm* — MORGAN, LEWIS & BOCKIUS LLP

(57) ABSTRACT

A method includes: inserting new pixels between original pixels for each of maps included in a first geometry buffer (or G-buffer) generated from a frame, wherein the maps represent geometric information of a three-dimensional (3D) model of an object included in the frame; generating a second G-buffer by setting values of the new pixels using a motion vector map that may be one of the maps; generating a third G-buffer by combining, with the second G-buffer, a result of updating only values of pixels masked based on an output of a pixel masking neural network to which the second G-buffer may be input; generating a fourth G-buffer by updating values of pixels by inputting the third G-buffer to a G-buffer reconstruction neural network; and update, based on the fourth G-buffer, the resolution of a subsequent frame that follows the frame.

18 Claims, 9 Drawing Sheets

(56) References Cited

U.S. PATENT DOCUMENTS

| | | | |
|---|---|---|---|
| 9,767,595 B2 | 9/2017 | Nystad et al. | |
| 10,909,659 B2 | 2/2021 | Croxford | |
| 11,367,165 B2 | 6/2022 | Xiao et al. | |
| 2020/0143507 A1* | 5/2020 | Jin | G06T 11/40 |
| 2022/0189109 A1* | 6/2022 | Panteleev | G06T 7/97 |
| 2022/0277421 A1 | 9/2022 | Xiao et al. | |
| 2024/0037835 A1* | 2/2024 | Croxford | G06F 9/4843 |
| 2024/0249383 A1* | 7/2024 | Hong | G06T 15/00 |

OTHER PUBLICATIONS

Xiao et al. "Neural supersampling for real-time rendering." *ACM Transactions on Graphics (TOG)* vol. 39. Issue 4. 2020 (pp. 1-12).
Burke "GPU Rendering & Game Graphics Pipeline Explained with nVidia." *Gamers nexus*. 2016 (pp. 1-10).

* cited by examiner

DEVICE AND METHOD WITH INCREASING RESOLUTION OF FRAME IN G-BUFFER DOMAIN

CROSS-REFERENCE TO RELATED APPLICATIONS

This application claims priority under 35 USC § 119(a) to Korean Patent Application No. 10-2023-0008997 filed on Jan. 20, 2023, in the Korean Intellectual Property Office, the disclosure of which is incorporated by reference herein in its entirety.

BACKGROUND

1. Field

The following description relates to a device and method with increasing the resolution of a frame in a geometry buffer (or G-buffer) domain.

2. Description of Related Art

Rendering may involve generating an image from a three-dimensional (3D) model or a two-dimensional (2D) model at a given viewing point. Rendering may include forward rendering that calculates each pixel and performs rendering, and deferred rendering that performs rendering using a geometry buffer (or G-buffer).

The above description is information the inventor(s) acquired during the course of conceiving the present disclosure, or already possessed at the time, and is not necessarily art publicly known before the present application was filed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes: one or more processors; a memory storing instructions configured to cause the one or more processors to: insert new pixels between original pixels for each of maps included in a first geometry buffer (G-buffer) and generated from a frame, the maps representing geometric information of a three-dimensional (3D) model of an object corresponding to the frame; generate a second G-buffer by updating values of the new pixels using a motion vector map that may be one the of the maps into which new pixels have been inserted; generate a third G-buffer by combining, with the second G-buffer, a result of updating only values of pixels masked based on the second G-buffer; and generate a fourth G-buffer by updating values of pixels based on the third G-buffer; increase the resolution of a subsequent frame that follows the frame based on the fourth G-buffer; and the memory, or a second memory, configured to store the fourth G-buffer.

The third G-buffer may be generated based on an output of an inference of a pixel masking neural network on the second G-buffer, and the fourth G-buffer may be updated based on inputting the third G-buffer to a buffer reconstruction neural network.

The pixel masking neural network may be trained in advance to minimize a difference between pixels masked based on a difference between values of pixels of maps included in the second G-buffer and values of pixels of maps included in a ground-truth G-buffer, and the pixels masked based on the output of the pixel masking network.

The G-buffer reconstruction neural network may be a network trained in advance to update values of pixels of maps included in the third G-buffer to values of pixels of maps included in a ground-truth G-buffer.

The motion vector map may be an upsampled motion vector map, and the instructions may be further configured to cause the one or more processors to warp values of pixels included in maps included in a fourth G-buffer of a previous frame into the new pixels, based on the upsampled motion vector map.

The masked pixels may be pixels including a 3D feature among pixels included in the maps included in the first G-buffer.

The frame may be generated based on a 3D model of a scene including the model of the 3D object, and the instructions may be further configured to cause the one or more processors to: combine, with the second G-buffer, a result of updating only the masked pixels using only a portion of the 3D object corresponding to the masked pixels.

The instructions may be further configured to cause the one or more processors to: output a frame having its resolution increased by combining maps included in the fourth G-buffer.

In another general aspect, an electronic device includes: an accelerator including a pixel masking neural network and a geometry buffer (or G-buffer) reconstruction neural network; a processor configured to: insert new pixels between original pixels of each of maps included in a first G-buffer generated from a frame; wherein the maps represent geometric information of a three-dimensional model (3D) of an object corresponding to the frame, generate a second G-buffer by updating values of the new pixels according to a motion vector map that may be one of the maps, generate a third G-buffer by combining, with the second G-buffer, a result of updating only values of pixels masked based on an output of the pixel masking neural network to which the second G-buffer may be input, and generate a fourth G-buffer by updating values of pixels by inputting the third G-buffer to the G-buffer reconstruction neural network; and a memory configured to store the fourth G-buffer, wherein, the electronic device may be configured to, based on the fourth G-buffer stored in the memory, increase the resolution of a subsequent frame that follows the frame.

The pixel masking neural network may be trained in advance to minimize a difference between pixels masked based on a difference between values of pixels of a plurality of maps included in the second G-buffer and values of pixels of a plurality of maps included in a ground-truth G-buffer, and the pixels masked based on the output of the pixel masking network.

The G-buffer reconstruction neural network may be trained in advance to update values of pixels of a plurality of maps included in the third G-buffer to values of pixels of a plurality of maps included in a ground-truth G-buffer.

In another general aspect, a method of operating an electronic device includes: inserting new pixels between original pixels for each of maps included in a first geometry buffer (or G-buffer) generated from a frame, wherein the maps represent geometric information of a three-dimensional (3D) model of an object included in the frame; generating a second G-buffer by setting values of the new pixels using a motion vector map that may be one of the maps; generating a third G-buffer by combining, with the second G-buffer, a result of updating only values of pixels masked based on an output of a pixel masking neural network to which the second G-buffer may be input; generating a fourth G-buffer by updating values of pixels by inputting the third G-buffer to a G-buffer reconstruction neural network; and update, based on the fourth G-buffer, the resolution of a subsequent frame that follows the frame.

The pixel masking neural network may be trained in advance to minimize a difference between pixels masked based on a difference between values of pixels of a plurality of maps included in the second G-buffer and values of pixels of a plurality of maps included in a ground-truth G-buffer, and the pixels masked based on the output of the pixel masking network.

The motion vector map may be an upsampled motion vector map, and the generating of the second G-buffer may include: warping values of pixels included in maps included in a fourth G-buffer of a previous frame into the new pixels, based on the upsampled motion vector map.

The inserted new pixels may initially have a pixel value of zero (0) or have no pixel value.

The masked pixels are pixels including a 3D feature among pixels included in the maps included in the first G-buffer.

The frame may be generated based on a 3D model of a scene including the 3D model of the object, and the generating of the third G-buffer may include: combining, with the second G-buffer, a result of updating only the masked pixels using a portion of the 3D object corresponding to the masked pixels.

Other features and aspects will be apparent from the following detailed description, the drawings, and the claims.

Figure 1:
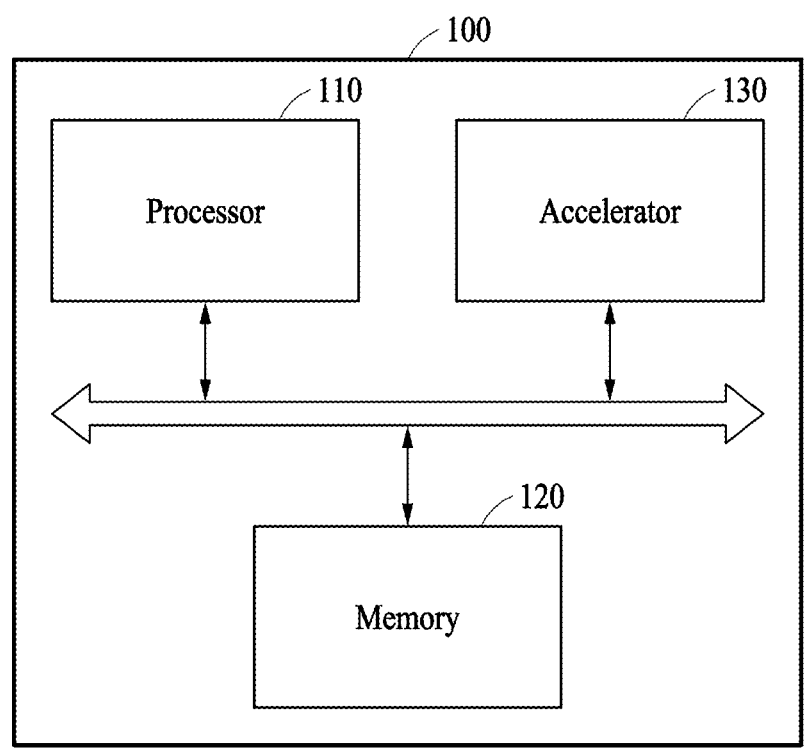
FIG. 1 illustrates an example electronic device, in accordance with one or more example embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example electronic device, in accordance with one or more example embodiments.

Referring to FIG. 1, an electronic device 100 may include a processor 110, a memory 120, and an accelerator 130. The processor 110, the memory 120, and the accelerator 130 may communicate with each other through a bus, a network-on-chip (NoC), a peripheral component interconnect express (PCIe), and/or the like. The electronic device 100 may include other general-purpose components in addition to the components illustrated in FIG. 1.

The processor 110 may perform an overall function for controlling the electronic device 100. The processor 110 may control the electronic device 100 overall by executing programs and/or instructions stored in the memory 120. The processor 110 may be implemented as a central processing unit (CPU), a graphics processing unit (GPU), an application processor (AP), and/or the like, included in the electronic device 100, but examples of which are not limited thereto.

The memory 120 may be hardware for storing data processed in the electronic device 100 and data to be processed in the electronic device 100. In addition, the memory 120 may store an application, a driver, or the like to be driven by the electronic device 100. The memory 120 may include a volatile memory such as a dynamic random-access memory (DRAM), and/or a nonvolatile memory.

The electronic device 100 may include the accelerator 130 (or a hardware accelerator) for operations or computations. The accelerator 130 may process tasks that may be more efficiently processed by a separate exclusive processor (i.e., the accelerator 130), rather than by the processor 110 for general purposes, based on the characteristics of the tasks. In this case, one or more processing elements (PEs) included in the accelerator 130 may be used. The accelerator 130 may be, for example, a neural processing unit (NPU), a tensor processing unit (TPU), a digital signal processor (DSP), a GPU, a neural engine, or the like that is suitable for performing neural network-based operations such as inferences, training etc.

A processor to be described below may be implemented as the processor 110, but examples of which are not limited thereto.

In an example, the processor 110 may generate a frame based on a three-dimensional (3D) scene having a 3D object. The processor 110 may generate, from the frame, a geometry buffer (or G-buffer) including geometric information of the 3D object included in the frame. The G-buffer may include various maps. For example, the G-buffer may include a depth map, an albedo map, a specular map, a normal map, and/or the like. The types of maps included in the G-buffer, and the G-buffer may vary according to the purpose of use.

The processor 110 may upsample the generated G-buffer to a high resolution ("high" refers to a higher resolution than prior to the upsampling and does not imply any particular resolution). The processor 110 may generate a high-resolution frame using a G-buffer upsampled to the high resolution.

Next, a graphics pipeline that turns vertices, texture, and the like of a 3D-model of a 3D object into pixels will be described.

Figure 2:
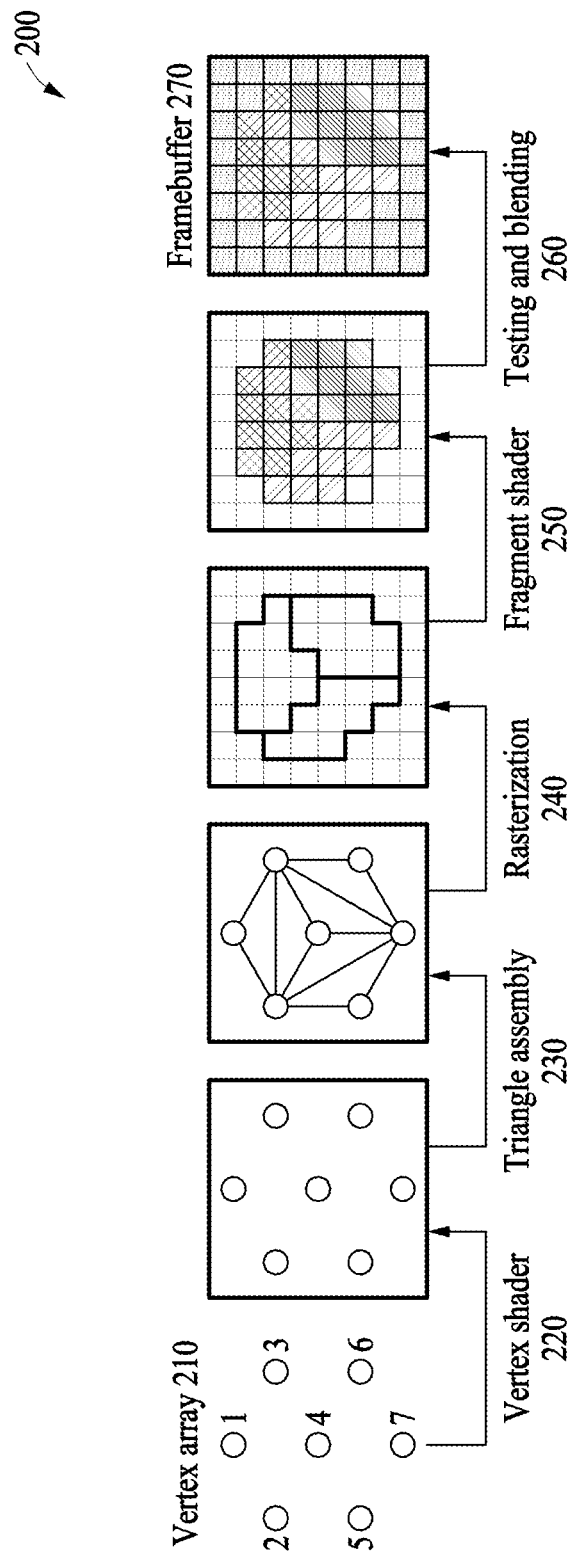
FIG. 2 illustrates an example graphics pipeline, in accordance with one or more example embodiments.

FIG. 2 illustrates an example graphics pipeline, in accordance with one or more example embodiments.

In the example of FIG. 2, a graphics pipeline 200 may be performed by a processor (e.g., the processor 110 of FIG. 1).

The processor may generate a vertex array 210. Each of generated vertices may be generated to represent a 3D object, for example, based on a mesh model of the 3D object.

In operation 220, the processor may perform shading using a vertex shader. The generated vertices may be defined by the vertex shader.

In operation 230, the processor may link the vertices to generate triangles.

In operation 240, the processor may perform rasterization. More specifically, the processor may convert, into pixels, a figure that is generated by combining the vertex shader and the vertices.

In operation 250, the processor may perform shading on the raster image using a fragment shader. More specifically, the processor may assign colors to the pixels using the fragment shader.

In operation 260, the processor may perform testing and blending on the colored raster image. For example, the processor may determine a pixel to be finally displayed, which may be done using a depth test on pixels corresponding to the same position.

The processor may then store the generated final image in a frame buffer 270. The image stored in the frame buffer 270 may be displayed through a display module.

Next, methods of supersampling from a low resolution to a high resolution are described.

Figure 3:
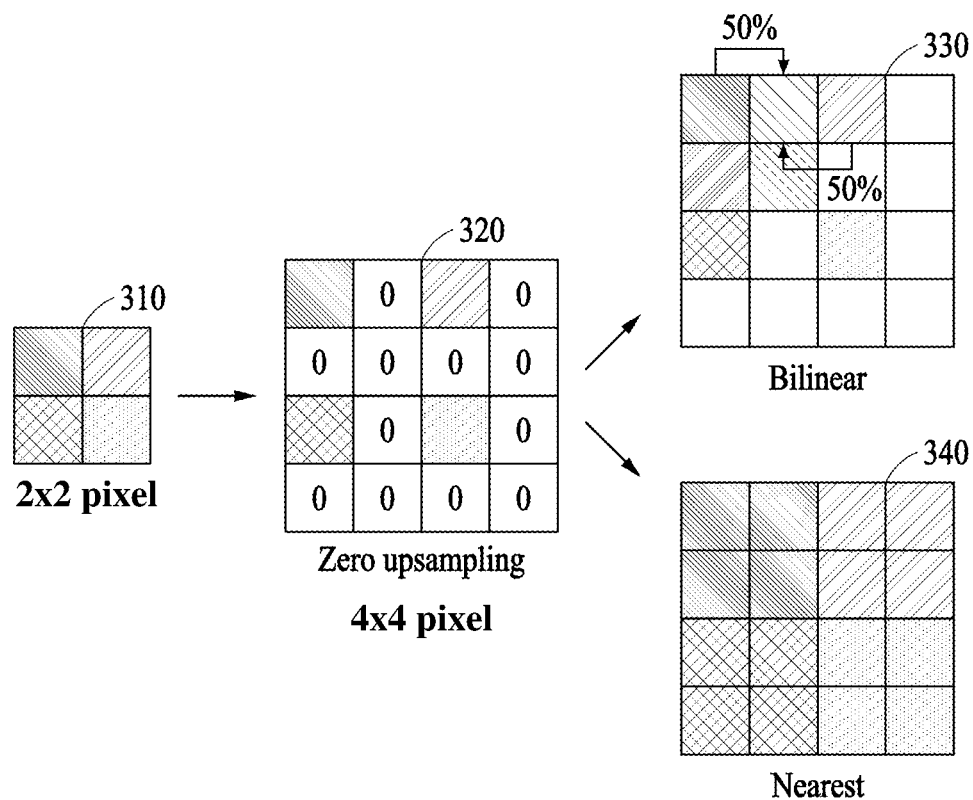
FIG. 3 illustrates example supersampling, in accordance with one or more example embodiments.

FIG. 3 illustrates example supersampling, in accordance with one or more example embodiments.

In the example of FIG. 3, an original frame 310 having a 2×2 pixel resolution may be supersampled into a frame having a 4×4 pixel resolution.

Referring to FIG. 3, the original frame 310 may include 2×2 original pixels. Supersampling of the original frame 310 will be described with reference to one example 2×2 pixel, with the understanding that the same process may be applied to all of the 2×2 pixels of the original frame 310.

First, a new 4×4 pixel is generated. New pixels are inserted between the original pixels in the 4×4 pixel and the new pixels may have initial values, for example, of zero (0), i.e., the original frame 310 may be zero-upsampled. Values of the inserted new pixels may be zero (0) or absent/undefined. In this case, although the resolution of the original frame 310 increases to 4×4, the values of the inserted new pixels may be 0 or absent, and thus a zero-upsampled frame 320 obtained through zero-upsampling may be dark. Therefore, it may be necessary to fill in the values of the new pixels.

A first high-resolution frame 330 may be generated such that the values of its new (zero) pixels are filled by bilinear upsampling method. For example, the bilinear upsampling method may fill in the values of each new/zero pixel using an average of corresponding neighbor pixel values of the original frame. In the illustrated example, the first high-resolution frame 330 may be blurred because the values of the new pixels are filled using averages of neighboring values of the original frame.

A second high-resolution frame 340 may be generated such that the values of its new/zero pixels are filled by a nearest neighbor upsampling method. For example, the nearest neighbor upsampling method may use a value of the nearest pixel as a value of a new pixel. In this example, the second high-resolution frame 340 may be clearer than the first high-resolution frame 330. However, because the original pixels are simply increased (e.g., doubled) from the original frame 310, aliasing may occur.

A new method of filling in values of new pixels is described with reference to FIG. 5.

Figure 4:
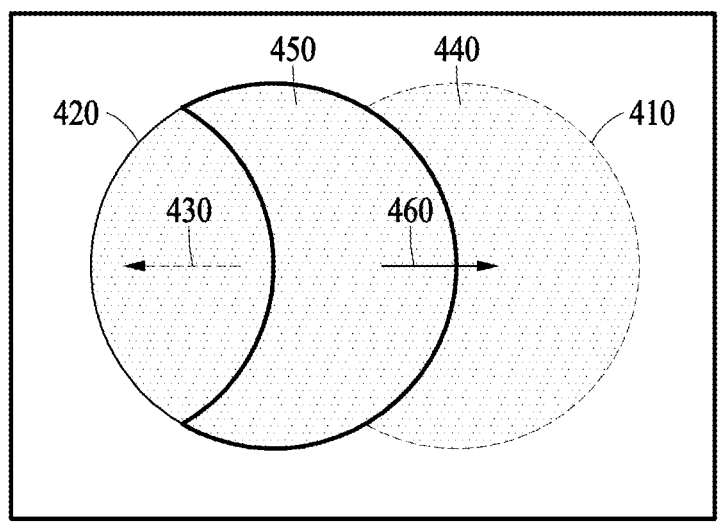
FIG. 4 illustrates an example motion vector and an example of filling a hole, in accordance with one or more example embodiments.

FIG. 4 illustrates an example motion vector and an example of filling a hole, in accordance with one or more example embodiments.

Referring to FIG. 4, movement of a circle from a previous frame to a current frame is shown.

Circle 410 indicates a position of the circle in the previous frame, also referred to as an i−1th frame. Circle 420 indicates a position of the circle in the current frame, also referred to as an ith frame. As shown in FIG. 4, the circle moves in a left direction 430.

A motion vector may indicate where (which pixel) a value of a pixel in a current frame is located in a previous frame. Such a motion vector is illustrated as a motion vector 460 in FIG. 4.

Because the circle is moving in the left direction 430, there may be a hole in the current frame, which is a space 440 where the circle 410 was previously and which is therefore not filled with pixel values. In this case, a typical method is to fill the hole in the space 440 with values of pixels in a space 450. That is, the hole may be filled by warping using the motion vector 460.

According to this typical method, there may be a ghost effect. Next, a method of warping using a motion vector without a ghost effect will be described.

Figure 5:
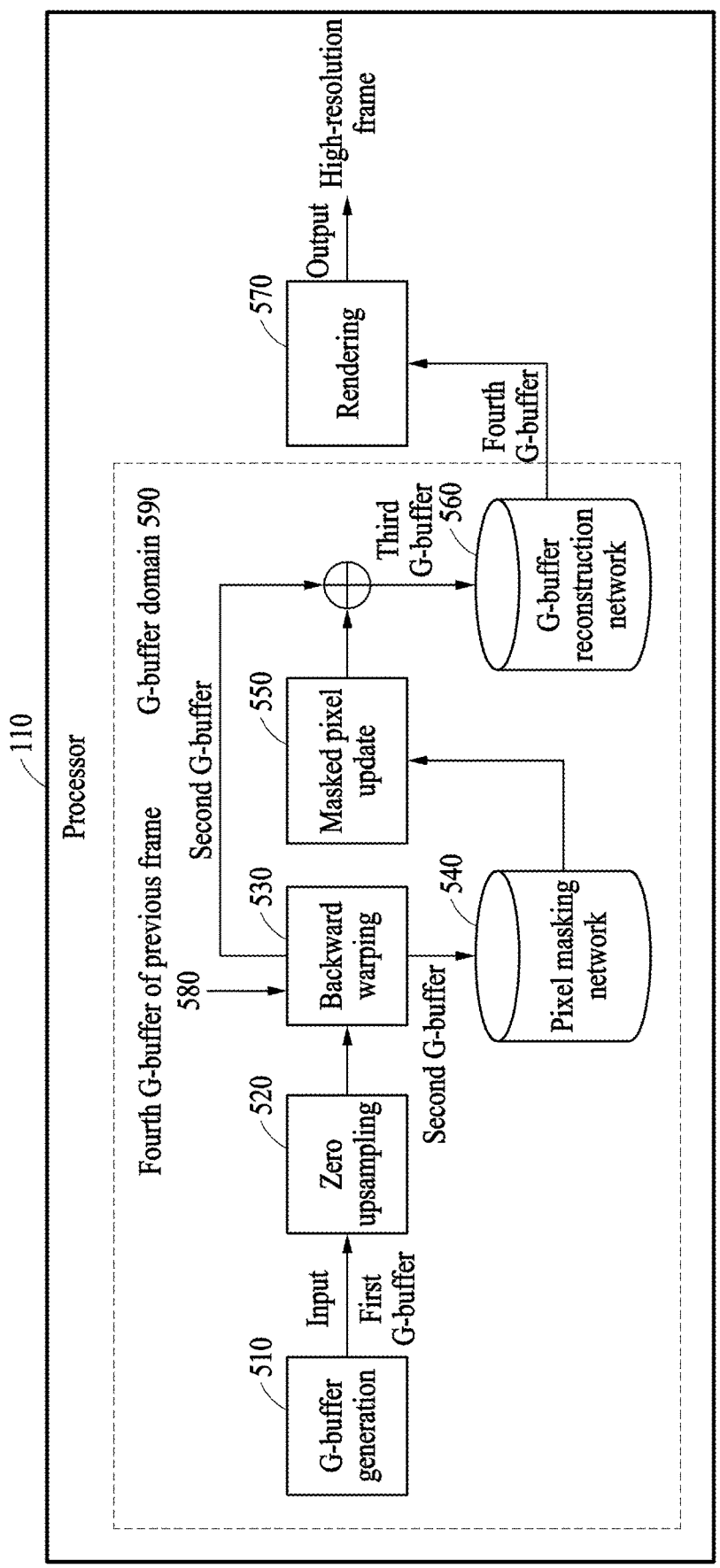
FIG. 5 illustrates example operations of an electronic device, in accordance with one or more example embodiments.

FIG. 5 illustrates an example of operations of an electronic device, in accordance with one or more example embodiments.

Referring to FIG. 5, an operation of converting a low-resolution frame into a high-resolution frame may be performed by the processor 110. However, examples are not limited thereto.

Rendering high-resolution frames at once may not be efficient due to a bottleneck or the like. Accordingly, the processor 110 may perform the following method to first generate a high-resolution G-buffer from a low-resolution G-buffer and then combine them to generate a high-resolution frame. Next, a method of converting a low-resolution ith frame into a high-resolution ith frame using a G-buffer is described.

In block 510, the processor 110 may generate a G-buffer.

The processor 110 may render a low-resolution frame from a 3D scene including a 3D object. The processor 110 may generate a low-resolution G-buffer from the low-resolution frame. The generation of the low-resolution G-buffer by the processor 110 may be performed very fast. This initially generated G-buffer may be referred to herein as a first G-buffer.

The first G-buffer may include maps representing geometric information of the 3D object included in the frame (although plural maps are discussed, a single map may also be used). The maps may include, for example, an albedo map of light, a normal map, a specular map, and/or a motion vector map. The albedo map may represent unique colors regardless of directions of light. The normal map may represent normal vectors. The specular map may emphasize a shining (specular) part. The motion vector map may represent motion vectors between a previous frame and a current frame, an example of which is described above with reference to FIG. 4. Examples of the maps are not limited thereto; maps of other types of information may also be used.

In block 520, the processor 110 may perform zero-upsampling on each of the maps included in the first G-buffer. Specifically, for each of the maps in the first G-buffer, the processor 110 may insert new pixels having a value of 0 (or having no value) between original pixels of the maps included in the first G-buffer. Thus, a map with the new pixels inserted may become dark. In this case, for backward warping of the inserted new pixels, the processor 110 may upsample a motion vector map among the plurality of maps by inputting values of the inserted new pixels thereto. For example, the processor 110 may input values to the inserted new pixels in the motion vector map using the bilinear upsampling method described above with reference to FIG. 3. However, an upsampling method that fills in values of new pixels in a motion vector map to be used for backward warping is not limited thereto.

In block 530, the processor 110 may perform backward warping on the zero-upsampled first G-buffer to input the values of the inserted new pixels. Specifically, since the values of the inserted new pixels are input to the expanded motion vector map in block 520, the processor 110 may use the upsampled motion vector map to input the values of the inserted new pixels for the other expanded maps.

The processor 110 may update the values of the inserted new pixels using the upsampled motion vector map (from block 520) and using maps included in a high-resolution G-buffer of a previous frame (i.e., G-buffer content upsampled for the previous frame). In this case, the upsampled motion vector map may be a motion vector of an ith frame, which is a current frame upsampled in block 520. The maps included in the high-resolution G-buffer of the previous frame may also be referred to as a fourth G-buffer 580 of an i−1th frame, which is the previous frame generated by a G-buffer reconstruction network described below. To summarize, once a high-resolution G-buffer has been generated it may be retained and used to increase the resolution of a subsequent frame.

The upsampled motion vector map may represent positions of pixels in the current frame to which value of pixels included in the previous frame have moved.

Accordingly, the processor 110 may warp high-resolution maps included in a fourth G-buffer of the previous frame using the upsampled motion vector map, and the warped previous high-resolution maps may be used to fill in the values of the inserted new pixels in the maps of the current frame. For example, assuming that a value of a pixel located at (5,5) in an albedo map of the previous frame has moved to a pixel located at (3,3) in an albedo map of the current frame. The processor 110 may use the upsampled motion vector map to recognize that the value of the pixel at (5,5) in the albedo map of the previous frame has moved to a value of the pixel at (3,3) in the albedo map of the current frame. Accordingly, the processor 110 may warp the value of the pixel at (5,5) of the previous frame to be the value of the pixel at (3,3) of the current frame.

In block 530, the processor 110 may warp values of pixels in the maps of the high-resolution G-buffer of the previous frame to be accurate pixel positions using the motion vector map, and a ghost effect may not remain, unlike what has been described above with reference to FIG. 2.

A G-buffer having values of inserted new pixels that are updated by backward warping may be referred to herein as a second G-buffer.

Even with backward warping, the new pixels may not be filled with correct values. That is, inaccurate values may be filled. Pixels filled with inaccurate values may be ones for which backward warping is not performed because there is no corresponding motion vector value. In addition, pixels that are not filled with correct values may be in an area where a ghost effect occurs despite the backward warping.

Therefore, it may be necessary to find and update pixels filled with inaccurate values for the maps included in the second G-buffer.

In block 540, in the second G-buffer, pixels filled with inaccurate values may be masked through a pixel masking network. The pixel masking network may mask the pixels filled with inaccurate values and display the masked pixels.

The pixel masking network may be a neural network trained to mask pixels filled with inaccurate values.

The pixel masking network may be trained using, as training data, the second G-buffer having content of a frame on which the operations from block 510 to block 530 are performed and a ground-truth G-buffer of the frame.

In this case, pixels that are to be masked when the second G-buffer of the training data is input to the pixel masking network may be referred to herein as first pixels. In addition, pixels that are to be masked when a difference between values of pixels of maps included in the second G-buffer of the training data and values of pixels of maps included in the ground-truth G-buffer is greater than or equal to a threshold value may be referred to herein as second pixels. The pixel masking network may be pretrained such that a difference between the first pixels and the second pixels is minimized. When the second G-buffer is input, the trained pixel masking network may mask pixels having a difference from the ground truth that is greater than or equal to a threshold value.

In an example, the pixel masking network may be performed in an accelerator rather than the processor 110 (e.g., the accelerator 130).

In block 550, because the masked pixels are those pixels that the pixel masking network has determined to be sufficiently incorrect, the processor 110 may update only values of the masked pixels based on an output of the pixel masking network. That is, the processor 110 may perform a partial update by updating only the masked pixels, i.e., excluding pixels that are not masked.

The processor 110 may update the masked pixels through rasterization and/or raytracing.

Such a partial updating method for masked pixels will be further described with reference to FIG. 8.

The processor 110 may generate a third G-buffer by combining the second G-buffer that has been backward warped (by block 530) and the portion of pixels that have been updated in block 550.

Although pixels having an inaccurate value (e.g., due to lack of a motion vector value or being in an area where there is a ghost effect) are updated in block 550, the third G-buffer may still include inaccurate values. These inaccurate values may be inaccurate because the motion vector map represents motion as a two-dimensional (2D) feature. That is, the motion vector map is a 2D vector representing a movement of a value of a pixel in a previous frame and a current frame, and thus pixels having a 3D feature may be filled with inaccurate values (e.g., motion in the third dimension is not directly represented). For example, the motion vector map is 2D, and it may be difficult to accurately fill values of inserted new pixels in a normal map (of normal vectors), and thus inaccurate values may be filled in. Thus, it may be beneficial to finally update these inaccurate values, as described next.

In block 560, the G-buffer reconstruction network to which the third G-buffer is input may update values of pixels of maps included in the third G-buffer.

The G-buffer reconstruction network may be a neural network trained to update pixels filled with inaccurate values for the third G-buffer. The G-buffer reconstruction network may be pre-trained to update pixels filled with inaccurate values using the ground-truth G-buffer that is used to train the pixel masking network. In an example, the G-buffer reconstruction network may be performed in an accelerator (e.g., accelerator 130) rather than the processor 110.

An output of the G-buffer reconstruction network may be a high-resolution G-buffer including high-resolution maps. The high-resolution G-buffer according to the output of the G-buffer reconstruction network may also be referred to herein as the fourth G-buffer. The generated fourth G-buffer may be retained in a memory or the like for later use for a next frame.

For example, a fourth G-buffer of a current frame may be stored in the memory or the like and may then be used to upsample a next frame to a high-resolution frame. For example, the fourth G-buffer of the current frame may be used for backward warping of the next frame. That is to say, a fourth G-buffer of an ith frame may be used for backward warping of an i+1th frame.

In block 570, the processor 110 may perform rendering using the fourth G-buffer, which is a high-resolution G-buffer. By the rendering using the fourth G-buffer, a high-resolution frame may be output. The processor 110 may combine maps included in the fourth G-buffer to output the high-resolution frame.

The processor 110 may obtain a low-resolution G-buffer relatively quickly, and then perform blocks 510 to 560 (which are the bulk of the operations) in a G-buffer domain 590, thereby enabling fast overall upsampled rendering. In addition, the processor 110 may reuse the motion vector map and the fourth G-buffer of a previous frame to accurately fill values of new pixels, unlike the upsampling method described above with reference to FIG. 3.

Next, operations in each block using each image are described.

Figure 6:
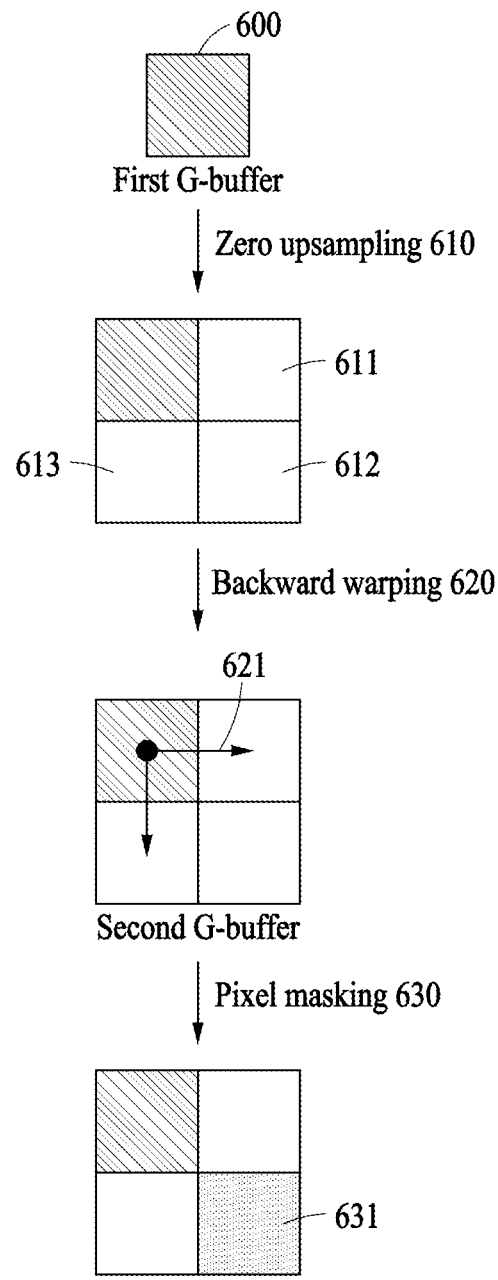
FIG. 6 illustrates example operations of an electronic device, in accordance with one or more example embodiments.

FIG. 6 illustrates example operations of an electronic device, in accordance with one or more example embodiments.

Referring to FIG. 6, images according to operations from blocks 510 to 540 of FIG. 5 are shown. Description with reference to a single pixel, as follows, applies to all of the pixels in a map.

An original pixel 600 may be an original pixel of one of the maps included in a low-resolution G-buffer generated from a low-resolution frame. That is, the original pixel 600 may be an original pixel of any one of the maps included in a first G-buffer (the description that follows applies to an arbitrary type of original map).

Zero-upsampling 610 may be performed to insert new pixels 611, 612, and 613 in an expanded (doubled) pixel of the original pixel 600. Values of the new pixels 611, 612, and 613 may be 0 or absent.

Backward warping 620 may be performed to update the values of the new pixels 611, 612, and 613. Backward warping 620 may be performed using a motion vector map among the maps (of a current frame). This motion vector map may be obtained by updating inserted new pixels according to the method described above with reference to FIG. 3. However, other methods of upsampling the motion vector map may be used.

The values of the new pixels may be filled in based on a motion vector 621 indicating a position of a pixel in a previous frame at which a value of a specific pixel in a current frame is located. Therefore, movement of pixel values may be identified through the motion vector 621, and thus the values of the new pixels may be filled based on the motion vector 621. A G-buffer including maps in which values of new pixels are updated based on a motion vector map may be a second G-buffer.

When the second G-buffer is input to a pixel masking neural network, pixel masking 630 may be performed such that only some pixels are masked. A masked pixel 631 may be a pixel that is obtained as an inaccurate value is updated and is then indicated as such by the pixel masking neural network. The masked pixel 631 may be a pixel that was not updated when backward warping 620 was performed. Alternatively, the masked pixel 631 may be a pixel that was updated when backward warping 620 was performed but was updated to an inaccurate value.

Next, a method of updating a masked pixel will be described.

Figure 7A:
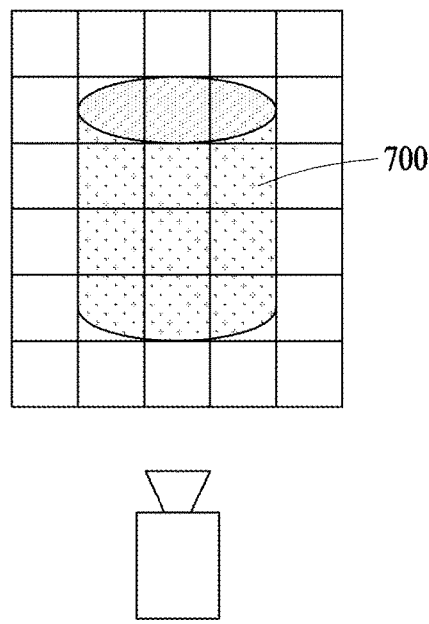
FIGS. 7A and 7B illustrate example operations performed in relation to a pixel masking network, in accordance with one or more example embodiments.
Figure 7B:
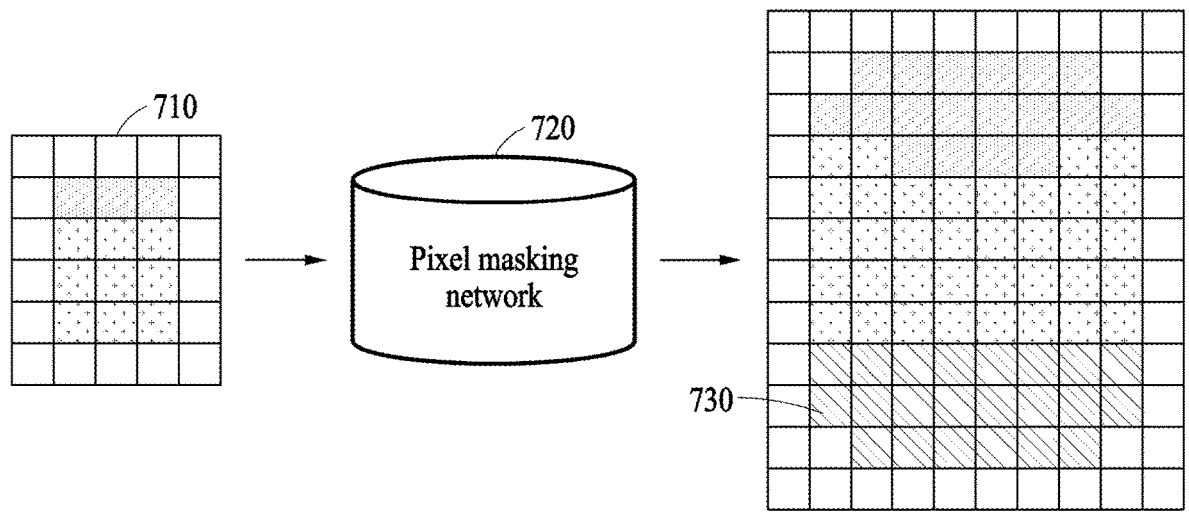

FIGS. 7A and 7B illustrate example operations performed in relation to a pixel masking network (e.g., a neural network), in accordance with one or more example embodiments.

FIG. 7A shows a 3D scene viewed from the front of a 3D object 700. To display the 3D scene viewed from the front of the 3D object 700 as a high-resolution frame, a processor may first render a low-resolution frame. A method of first rendering a 5×6 low-resolution frame to generate a 10×12 high-resolution frame and then generating a high-resolution frame using is described next, with the understanding that the resolutions are only examples and resolutions are not limited thereto.

Next, for the convenience of description, one of the maps included in a G-buffer will be described, but examples are not limited thereto.

FIG. 7B shows pixels masked by a pixel masking network.

The processor may generate a low-resolution G-buffer from a rendered low-resolution frame. That is, the processor may generate a first G-buffer from the low-resolution frame. The first G-buffer may include maps. The example map 710 may be representative of any of the maps included in the first G-buffer.

After new pixels are inserted and values of the new pixels are updated based on a motion vector map (which may have been upsampled), the updated map 710 (included in a second G-buffer) may be input to a pixel masking network 720.

The pixel masking network 720 may mask pixels filled with inaccurate values. Block 550 of FIG. 5 may be performed on the masked pixels. That is, only the values of the masked pixels 730 may be updated by block 550.

Next, a method of updating pixel values only for the masked pixels 730 is described.

Figure 8:
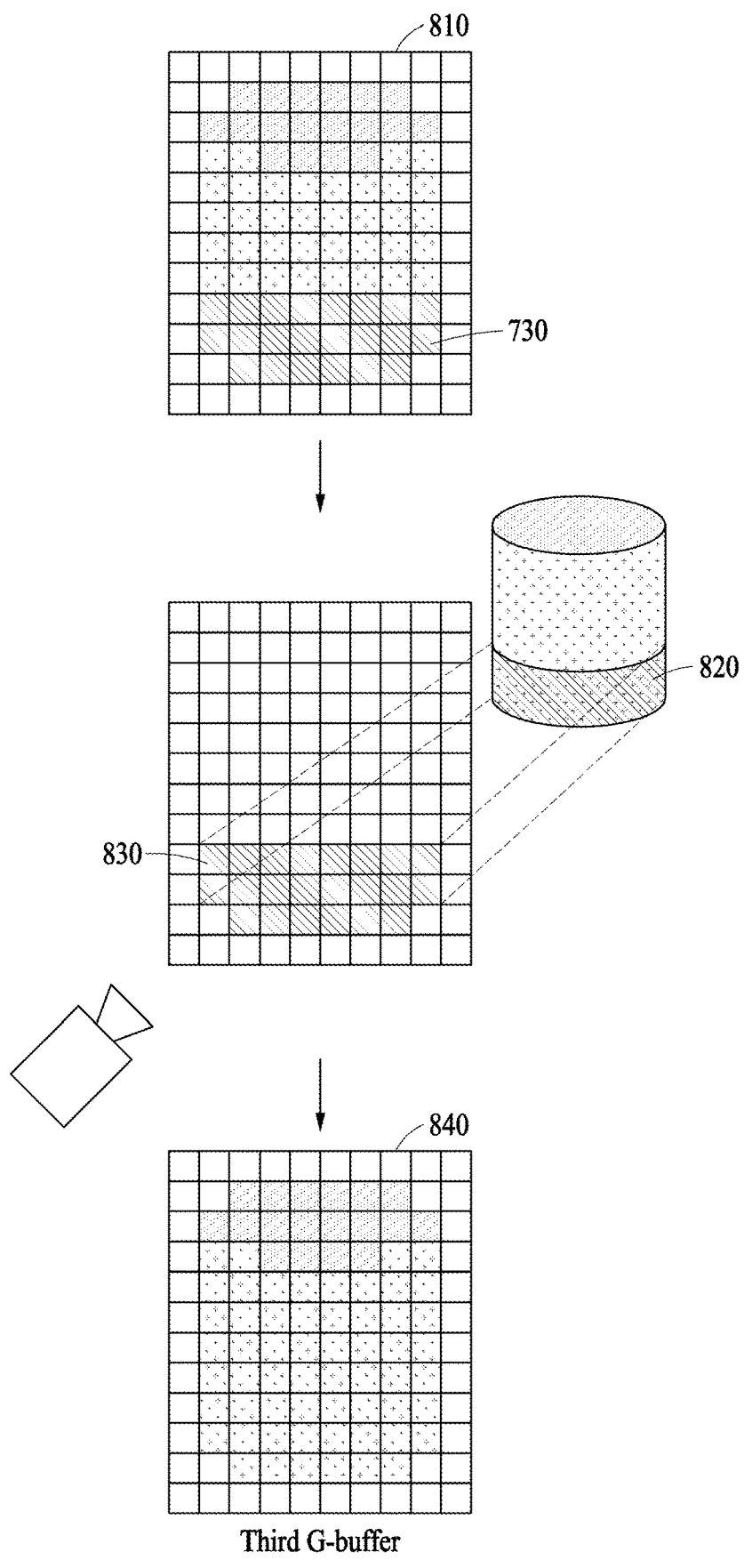
FIG. 8 illustrates an example of updating a masked pixel, in accordance with one or more example embodiments.

FIG. 8 illustrates an example of updating a masked pixel, in accordance with one or more example embodiments.

Although rasterization and/or raytracing may be used to update the masked pixels 730, for convenience, only the rasterization technique will be described.

The processor may project a portion 820 of a 3D object corresponding to the masked pixels 730 to obtain (e.g., render) pixels 830 that have values for updating values of the masked pixels 730.

The processor may combine the pixels 830 and map 810 including the masked pixels 730 to generate a map 840 having accurate values. A G-buffer including maps with such accuracy-enhanced values may be a third G-buffer.

It may be ineffective (computationally expensive) to update all pixels in order to update the masked pixels 730. Accordingly, it may be effective to update only the masked pixels 730 using the portion 820 of the 3D object corresponding to the masked pixels 730.

However, even the third G-buffer may still include pixels that do not have accurate values depending on a limitation in training a pixel masking network and the characteristics of a motion vector map. The third G-buffer may be input to a G-buffer reconstruction network to update the corresponding pixels.

Figure 9:
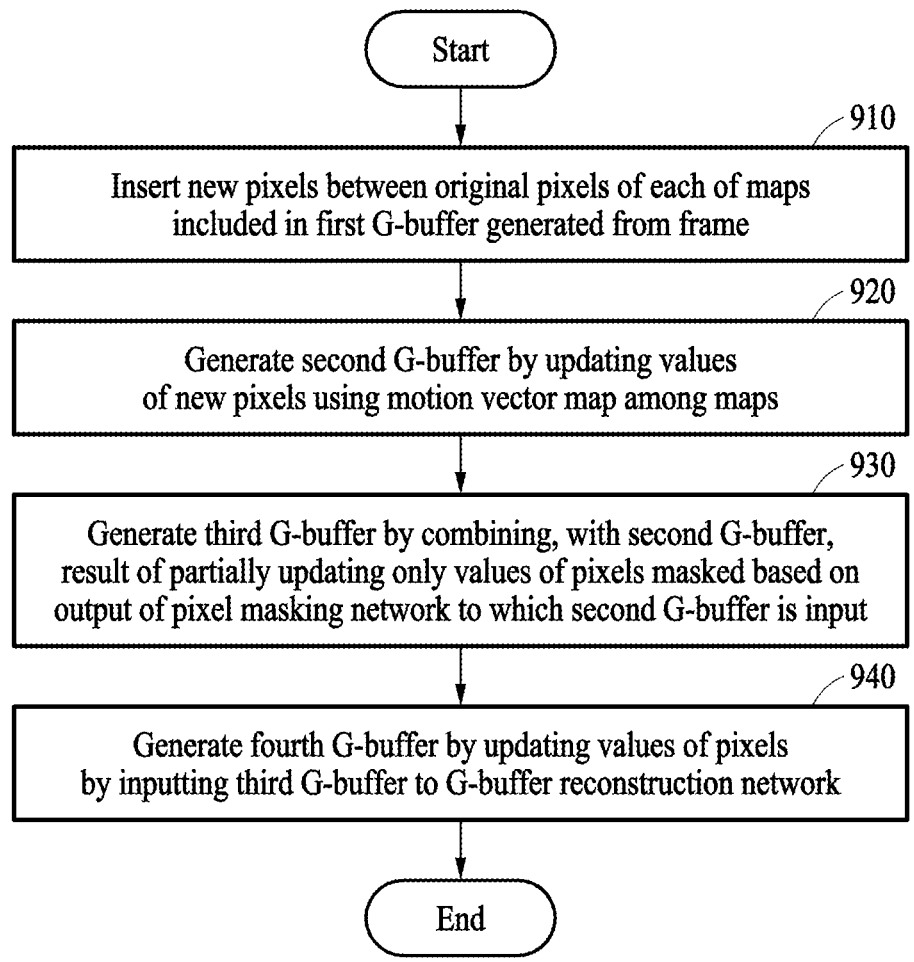
FIG. 9 illustrates an example method of operating an electronic device, in accordance with one or more example embodiments.

FIG. 9 illustrates an example method of operating an electronic device, in accordance with one or more example embodiments.

The following operations (e.g., operations 910 to 940) may be performed by an electronic device (e.g., the electronic device 100). Specifically, a processor (e.g., the processor 110) of the electronic device (e.g., the electronic device 100) may perform the following operations.

In operation 910, the processor may insert new pixels between original pixels of each of maps included in a first G-buffer generated (upscaled) from a low-resolution frame. The first G-buffer may include the maps representing geometric information of a 3D object included in the frame.

In operation 920, the processor may generate a second G-buffer by updating values of the new pixels using a motion vector map (which may be one of the maps).

In operation 930, the processor may generate a third G-buffer by combining, with the second G-buffer, a result of updating only values of pixels that are masked (masked based on an output of a pixel masking network to which the second G-buffer is input).

In operation 940, the processor may generate a fourth G-buffer by inputting the third G-buffer to a G-buffer reconstruction network and updating the values of the pixels.

The processor may update a resolution of a subsequent frame that follows the frame based on the fourth G-buffer.

The computing apparatuses, the electronic devices, the processors, the memories, the displays, the information output system and hardware, the storage devices, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer.

Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:
1. An electronic device, comprising:
one or more processors;
a memory storing instructions configured to cause the one or more processors to:
  insert new pixels between original pixels for each of maps comprised in a first geometry buffer (G-buffer) and generated from a frame, the maps representing geometric information of a three-dimensional (3D) model of an object corresponding to the frame;
  generate a second G-buffer by updating values of the new pixels using a motion vector map that is one the of the maps and has been upsampled;

generate a third G-buffer by combining, with the second G-buffer, a result of updating only values of pixels masked based on the second G-buffer; and generate a fourth G-buffer by updating values of pixels based on the third G-buffer;

increase the resolution of a subsequent frame that follows the frame based on the fourth G-buffer; and the memory, or a second memory, configured to store the fourth G-buffer.

2. The electronic device of claim 1, wherein the third G-buffer is generated based on an output of an inference of a pixel masking neural network on the second G-buffer, and wherein the fourth G-buffer is updated based on inputting the third G-buffer to a G-buffer reconstruction neural network.

3. The electronic device of claim 2, wherein the pixel masking neural network is trained in advance to minimize a difference between pixels masked based on a difference between values of pixels of maps comprised in the second G-buffer and values of pixels of maps comprised in a ground-truth G-buffer, and the pixels masked based on the output of the pixel masking neural network.

4. The electronic device of claim 2, wherein the G-buffer reconstruction neural network is a network trained in advance to update values of pixels of maps comprised in the third G-buffer to values of pixels of maps comprised in a ground-truth G-buffer.

5. The electronic device of claim 1, wherein the motion vector map is an upsampled motion vector map, and wherein the instructions are further configured to cause the one or more processors to warp values of pixels comprised in maps comprised in a fourth G-buffer of a previous frame into the new pixels, based on the upsampled motion vector map.

6. The electronic device of claim 1, wherein the masked pixels are pixels comprising a 3D feature among pixels comprised in the maps comprised in the first G-buffer.

7. The electronic device of claim 1, wherein the frame is generated based on a 3D model of a scene comprising the model of the object, wherein the instructions are further configured to cause the one or more processors to: combine, with the second G-buffer, a result of updating only the masked pixels using only a portion of the object corresponding to the masked pixels.

8. The electronic device of claim 1, wherein the instructions are further configured to cause the one or more processors to:

output a frame, wherein the resolution of the frame is increased by combining maps comprised in the fourth G-buffer.

9. An electronic device, comprising:

an accelerator comprising a pixel masking neural network and a geometry buffer (or G-buffer) reconstruction neural network;

a processor configured to:

insert new pixels between original pixels of each of maps comprised in a first G-buffer generated from a frame; wherein the maps represent geometric information of a three-dimensional model (3D) of an object corresponding to the frame, generate a second G-buffer by updating values of the new pixels according to a motion vector map that is one of the maps, generate a third G-buffer by combining, with the second G-buffer, a result of updating only values of pixels masked based on an output of the pixel masking neural network to which the second G-buffer is input, and generate a fourth G-buffer by updating values of pixels by inputting the third G-buffer to the G-buffer reconstruction neural network; and a memory configured to store the fourth G-buffer, wherein, the electronic device is configured to, based on the fourth G-buffer stored in the memory, increase the resolution of a subsequent frame that follows the frame.

10. The electronic device of claim 9, wherein the pixel masking neural network is trained in advance to minimize a difference between pixels masked based on a difference between values of pixels of a plurality of maps comprised in the second G-buffer and values of pixels of a plurality of maps comprised in a ground-truth G-buffer, and the pixels masked based on the output of the pixel masking neural network.

11. The electronic device of claim 9, wherein the G-buffer reconstruction neural network is trained in advance to update values of pixels of a plurality of maps comprised in the third G-buffer to values of pixels of a plurality of maps comprised in a ground-truth G-buffer.

12. A method of operating an electronic device, comprising:

inserting new pixels between original pixels for each of maps comprised in a first geometry buffer (or G-buffer) generated from a frame, wherein the maps represent geometric information of a three-dimensional (3D) model of an object comprised in the frame;

generating a second G-buffer by setting values of the new pixels using a motion vector map that is one of the maps;

generating a third G-buffer by combining, with the second G-buffer, a result of updating only values of pixels masked based on an output of a pixel masking neural network to which the second G-buffer is input;

generating a fourth G-buffer by updating values of pixels by inputting the third G-buffer to a G-buffer reconstruction neural network; and updating, based on the fourth G-buffer, the resolution of a subsequent frame that follows the frame.

13. The method of claim 12, wherein the pixel masking neural network is trained in advance to minimize a difference between pixels masked based on a difference between values of pixels of a plurality of maps comprised in the second G-buffer and values of pixels of a plurality of maps comprised in a ground-truth G-buffer, and the pixels masked based on the output of the pixel masking neural network.

14. The method of claim 12, wherein the motion vector map is an upsampled motion vector map, and wherein the generating of the second G-buffer comprises:

warping values of pixels comprised in maps comprised in a fourth G-buffer of a previous frame into the new pixels, based on the upsampled motion vector map.

15. The method of claim 12, wherein the inserted new pixels initially have a pixel value of zero (0) or have no pixel value.

16. The method of claim 12, wherein the masked pixels are pixels comprising a 3D feature among pixels comprised in the maps comprised in the first G-buffer.

17. The method of claim 12, wherein the frame is generated based on a 3D model of a scene comprising the 3D model of the object, and wherein the generating of the third G-buffer comprises: combining, with the second G-buffer, a result of updating only the masked pixels using a portion of the object corresponding to the masked pixels.

18. The method of claim 12, further comprising: outputting a frame having a resolution increased by combining a plurality of maps comprised in the fourth G-buffer.

\* \* \* \* \*